US009480090B2

(12) United States Patent
Bosch et al.

(10) Patent No.: US 9,480,090 B2
(45) Date of Patent: Oct. 25, 2016

(54) METHOD AND SYSTEM FOR OPTIMISING ROUTING BETWEEN TWO NETWORK NODES, AT LEAST ONE OF WHICH IS MOBILE

(75) Inventors: Peter Bosch, MN Aalsmeer (NL); Sape Mullender, KA Amsterdam (NL); Paul Polakos, Marlboro, NJ (US); Noah Evans, Antwerp (BE); Georg Hampel, New York, NY (US); Jim McKie, Murray Hill, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 251 days.

(21) Appl. No.: 13/825,498

(22) PCT Filed: Sep. 21, 2011

(86) PCT No.: PCT/EP2011/066434
§ 371 (c)(1),
(2), (4) Date: Aug. 5, 2013

(87) PCT Pub. No.: WO2012/038473
PCT Pub. Date: Mar. 29, 2012

(65) Prior Publication Data
US 2013/0308559 A1   Nov. 21, 2013

(30) Foreign Application Priority Data
Sep. 23, 2010   (EP) .................................... 10306021

(51) Int. Cl.
*H04W 76/02*   (2009.01)
*H04L 12/46*   (2006.01)
(Continued)

(52) U.S. Cl.
CPC ........ *H04W 76/021* (2013.01); *H04L 12/4633* (2013.01); *H04L 12/66* (2013.01);
(Continued)

(58) Field of Classification Search
CPC ............... H04L 12/4633; H04L 12/66; H04L 29/12301; H04L 61/2076; H04L 29/12339; H04L 61/2503; H04W 76/021; H04W 88/182; H04W 80/045
See application file for complete search history.

(56) References Cited

U.S. PATENT DOCUMENTS 6,980,801 B1   12/2005   Soininen et al.
2005/0175016 A1   8/2005   Kim et al.
(Continued)

FOREIGN PATENT DOCUMENTS

EP   1 662 746 A1   5/2006
EP   1 983 791 A1   10/2008

OTHER PUBLICATIONS

Alactel-Lucent, "Beyond the Base Station Router," Dec. 2008.*
(Continued)

*Primary Examiner* — Jae Y Lee
(74) *Attorney, Agent, or Firm* — Fay Sharpe, LLP

(57) ABSTRACT

A method is disclosed for routing packets in an intermediate node between a mobile node and a correspondent node in a packet-switched network, only one of said nodes being macro-mobility enabled, comprising at the intermediate node: —exchanging lower-layer-address-update-related messages with said macro-mobility enabled node; —mapping source address, destination address and potentially protocol parameters of lower-layer packets exchanged between the mobile node and the correspondent node in such a way that the macro-mobility enabled node can communicate with the other node as if the other node is also macro-mobility enabled, and such that the other node can communicate with the intermediate node as if the intermediate node is a non-macro-mobility-enabled node. Also associated devices, update methods for devices, and servers are disclosed.

12 Claims, 5 Drawing Sheets

(51) Int. Cl.
*H04L 12/66* (2006.01)
*H04L 29/12* (2006.01)
*H04W 88/18* (2009.01)
*H04W 80/04* (2009.01)

(52) U.S. Cl.
CPC ..... *H04L29/12301* (2013.01); *H04L 61/2076* (2013.01); *H04W 88/182* (2013.01); *H04L 29/12339* (2013.01); *H04L 61/2503* (2013.01); *H04W 80/045* (2013.01)

(56) References Cited

U.S. PATENT DOCUMENTS

2006/0148479 A1* 7/2006 Park et al. .................... 455/437
2010/0135301 A1* 6/2010 Bosch et al. .................. 370/392

OTHER PUBLICATIONS

International Search Report for PCT/EP2011/066434 dated Nov. 25, 2011.

* cited by examiner

METHOD AND SYSTEM FOR OPTIMISING ROUTING BETWEEN TWO NETWORK NODES, AT LEAST ONE OF WHICH IS MOBILE

TECHNICAL FIELD OF THE INVENTION

The present invention relates to the field of methods and devices for routing data packets between two network nodes, at least one of which is a mobile network node.

BACKGROUND OF THE INVENTION

A communications network comprises two or more nodes and the physical link(s) between the nodes. On a packet-switched communications network, e.g., the Internet, communications are in the form of discrete units of information known as packets. A typical communication on the Internet is between two endpoint nodes generating and sending packets to each other via one or more links and zero, one, or more intermediate nodes.

The Internet is a digital packet-switched network that uses the four-layer Internet Procotol suite for the generation and processing of packets. The Internet Protocol suite (IP suite) is defined in Internet Engineering Task Force (IETF) Request for Comment (RFC) 1122. The lowest layer of the IP suite is the link layer (e.g., Ethernet), followed by the network layer (e.g., Internet Protocol (IP)), the transport layer (e.g., Transport Control Procotol (TCP)), and, highest, the application layer (e.g., Simple Mail Transport Protocol (SMTP) or Hypertext Transfer Protocol (HTTP)). The term "session" refers to a communication between two nodes at a particular layer, e.g., a link-layer session or a transport session. The term "conversation" refers to a transport-layer session or an application-layer session or a combined transport/application layer session. The two nodes in a conversation are referred to as correspondent nodes.

The establishment of a session at a particular layer typically requires that all lower layers have established a session. For example, establishing a conversation typically requires sessions to be established at the transport, network, and link layers. Conversely, terminating a session at a particular layer typically terminates all sessions at higher layers, e.g., terminating an IP session (network layer) typically terminates transport-layer sessions and application-layer sessions (i.e., conversations).

A typical node connects to the Internet via an access network. A typical access network comprises a router that manages an IP-address range also known as a subnet. A router is a network node that retransmits received packets towards one or more other network nodes. A node connects to the Internet by first establishing a link-layer (e.g., Ethernet) connection with the access-network router. Typically, the router then assigns the next available address from the subnet to the node. The node then can establish transport-layer sessions and conversations with other nodes on the Internet.

Moving a node within an access network typically does not terminate the node's conversations. For instance link-layer protocols, such as the Address Resolution Protocol (ARP), allow a node to change its link-layer address without disturbing higher-layer protocols. In other words, a typical node is able to change its link-layer session without disturbing its network-layer, transport-layer, or application-layer sessions. This ability is known as micro-mobility.

Macro-mobility is the ability to change a network-layer session without disturbing transport-layer and application-layer sessions. The most common network-layer protocol in use today, IP version 4 (IPv4), does not provide macro-mobility. IPv4 is defined in IETF RFC 791. Thus, when the network-layer session on an IPv4 node is interrupted, all of the node's conversations are terminated.

A response to the lack of macro-mobility in IPv4 has been new network-layer protocols that support macro-mobility. One class of the new network-layer protocols is referred to as Mobile IP (MIP). MIP protocols include Mobility Support in IP version 4 (MIPv4), defined in IETF RFC 3344, and Mobility Support in IP version 6 (MIPv6), which is defined in IETF RFCs 3775 and 4866.

Both MIPv4 and MIPv6 provide macro-mobility through triangular routing. Triangular routing has a number of disadvantages, such as increased complexity, increased packet overhead, and exclusion of more-efficient routes.

In U.S. patent application US 2010/0135301, alternative methods for implementing macro-mobility in an IP network are described, which avoid triangular routing, and which are referred to as NMIP (Not Mobile IP). Not Mobile IP (NMIP) is an end-host-based signaling protocol that enables Mobile Nodes (MNs) and Correspondent Nodes (CNs) to update each other with IP address changes at mobility events and to reroute traffic for established TCP, UDP, ESP, etc. . . . sessions using newly obtained IP addresses without breaking connections. Backward compatibility is provided by a mechanism in which a first node which sends an address update to a second node, and does not receive feedback before a address-update-reply timer expires, periodically sends address-update (related) messages to the old NMIP mobility router, which behaves as a MIP agent.

There is a need for alternative solutions in the NMIP framework which can provide backward compatibility with network nodes which are not NMIP enabled/compliant.

SUMMARY OF THE INVENTION

According to a first aspect of the present invention, a method for routing packets in an intermediate node between correspondent nodes in a packet-switched network is disclosed, the packet-switched network having a protocol stack comprising an upper layer and a lower layer and comprising an upper-layer session between a correspondent node and a mobile node in which packets are transmitted between the correspondent node and the mobile node via the packet-switched network; and wherein only one of the correspondent node and the mobile node, called a macro-mobility enabled node, is adapted for maintaining the upper-layer session with the other node, when the mobile node is switching from a first lower-layer-address to a second lower-layer-address, different from the first lower-layer-address, by exchanging suitable lower-layer address update related messages with the other node, comprising at the intermediate node:
  exchanging lower-layer-address-update-related messages with the macro-mobility enabled node;
  mapping source and destination address of lower-layer packets exchanged between the mobile node and the correspondent node in such a way that the macro-mobility enabled node can communicate with the other node as if the other node is also macro-mobility enabled, and such that the other node can communicate with the intermediate node as if the intermediate node is a non-macro-mobility-enabled node.

This provides the advantage that macro-mobility management is possible even if one of two correspondent nodes is itself not capable of maintaining the upper-layer session with the other node, when the mobile node is switching from a first lower-layer-address to a second lower-layer-address. Backward compatibility is provided with state of the art systems which are not intrinsically capable of managing macromobility.

According to preferred embodiments, the method further comprises performing DHCP services, or other layer-2 specific functions to obtain an IP address for an interface, by said intermediate node.

According to preferred embodiments, the lower-layer address update related messages are messages used in methods according to the NMIP protocol, as defined in U.S. patent application US 2010/0135301. This allows a full deployment of NMIP and the start of an ecosystem for NMIP-capable hosts.

According to preferred embodiments, the upper layer is a transport layer or an application layer, and the lower layer is a network layer. The lower layer, the network layer, can be an IP layer, for instance an IPv4 layer or IPv6 layer.

According to preferred embodiments, the method can be advantageously applied when the mobile node is not assigned a permanent lower-layer address corresponding to a home-network lower-layer address. Such a permanent lower-layer address corresponding to a home-network lower-layer address is for instance assigned to a mobile node in the Mobile IP framework.

According to a first family of preferred embodiments, the intermediate node is embodied as a user-level application installed on a non-macro-mobility enabled user device, the non-macro-mobility enabled user device corresponding to the mobile node.

Preferably, exchanging lower-layer-address-update related messages comprises receiving lower-layer-address update related messages from the correspondent node and sending lower-layer-address update related messages to the correspondent node, and mapping source and destination address of lower-layer packets exchanged between the mobile node and the correspondent node comprises for packets sent from the mobile node to the correspondent node: replacing the lower layer source address, assigned by the intermediate node to the mobile node, by the lower layer address of the intermediate node, and, when multiple user devices are supported through the same intermediate node, replacing protocol specific parameters such as TCP port numbers. This function is generally known as a Network Address Port Translation (NAPT) function;

for packets sent from the correspondent node to the mobile node: replacing the destination address corresponding to the lower-layer address of the intermediate node by the lower-layer address of the mobile node assigned by the intermediate node, and if needed replacing protocol specific parameters.

Protocol specific parameters can be for instance TCP port numbers or . . . .

According to a second family of preferred embodiments, the intermediate node is embodied by a network server, which communicates with the non-macro-mobility enabled correspondent node.

Preferably, exchanging the lower-layer-address-update related messages comprises receiving lower-layer-address update-related messages from the mobile node and sending lower-layer-address update related messages to the mobile node, and wherein mapping source and destination address of lower-layer packets exchanged between the mobile node and the correspondent node comprises for packets sent from the correspondent node to the mobile node: replacing the lower layer source address, assigned by the intermediate node to the mobile node, by the lower layer address of the intermediate node, and potentially replacing protocol parameters;

for packets sent from the mobile node to the correspondent node: replacing the destination address corresponding to the lower-layer address of the intermediate node by the lower-layer address of the mobile node assigned by the intermediate node, and potentially replacing protocol parameters.

According to a second aspect of the present invention, a mobile device for use in data communication in a packet-switched network is disclosed, the network having a protocol stack comprising an upper layer and a lower layer, and the mobile device being adapted for participating in an upper-layer session between a mobile node comprised in the mobile device and a correspondent node in the network, the mobile device comprising a storage means for storing and a processor for running a user level application embodying an intermediate node of the network, the intermediate node being adapted for exchanging lower-layer-address-update-related messages with the correspondent node;

mapping source address, destination address and potentially protocol parameters of lower-layer packets exchanged between the mobile node and the correspondent node in such a way that the correspondent node can communicate with the mobile node as if the mobile node is also macro-mobility enabled, and such that the mobile node can communicate with the intermediate node as if the intermediate node is a non-macro-mobility-enabled node.

According to a third aspect of the present invention, a method for updating a mobile device for use in data communication in a packet-switched network is disclosed, the network having a protocol stack comprising an upper layer and a lower layer, and the mobile device being adapted for participating in an upper-layer session between a mobile node comprised in the mobile device and a correspondent node in the network, the mobile device comprising a storage means for storing and a processor for running user-level applications, comprising installing a user-level application on the mobile device embodying an intermediate node, the intermediate node being adapted for exchanging lower-layer-address-update-related messages with the correspondent node;

mapping source address, destination address and potentially protocol parameters of lower-layer packets exchanged between the mobile node and the correspondent node in such a way that the correspondent node can communicate with the mobile node as if the mobile node is also macro-mobility enabled, and such that the mobile node can communicate with the intermediate node as if the intermediate node is a non-macro-mobility-enabled node.

According to preferred embodiments, the intermediate node adopts one or more of the original lower-layer addresses of the mobile node and assigns a new lower-layer address to the mobile node during installation.

According to a fourth aspect of the present invention, a server for use as an intermediate node in a packet-switched network is disclosed, the network having a protocol stack comprising an upper layer and a lower layer, and the server being adapted for participating in an upper-layer session between a mobile node and a correspondent node, the server being adapted for exchanging lower-layer-address-update-related messages with the mobile node;

mapping source address, destination address and potentially protocol parameters of lower-layer packets exchanged between the mobile node and the correspondent node in such a way that the mobile node can communicate with the correspondent node as if the correspondent node is also macro-mobility enabled, and such that the correspondent node can communicate with the intermediate node as if the intermediate node is a non-macro-mobility-enabled node.

Further aspects of the present invention are described by the dependent claims. The features from the dependent claims, features of any of the independent claims and any features of other dependent claims may be combined as considered appropriate to the person of ordinary skill, and not only in the particular combinations as defined by the claims.

BRIEF DESCRIPTION OF THE DRAWINGS

The accompanying drawings are used to illustrate embodiments of the present invention.

Reference signs are chosen such that they are the same for similar or equal elements or features in different figures or drawings.

DESCRIPTION OF ILLUSTRATIVE EMBODIMENTS

The above and other advantageous features and objects of the invention will become more apparent and the invention will be better understood from the following detailed description when read in conjunction with the respective drawings.

Not Mobile IP (NMIP) is an end-host-based signaling protocol that enables Mobile Nodes (MNs) and Correspondent Nodes (CNs) to update each other with IP address changes at mobility events and to reroute traffic for established TCP, UDP, ESP, etc. . . . sessions using newly obtained IP addresses without breaking connections. For instance, if a MN is connected via a 3g cellular connection, and it finds an association with a WiFi base station, the MN can signal all correspondent nodes the IP address associated with the WiFi connection and migrate all existing sessions to start using the WiFi connection without breaking those connections first. NMIP is described in detail in US 2010/0135301, which is hereby incorporated by reference in its entirety.

Figure 1:
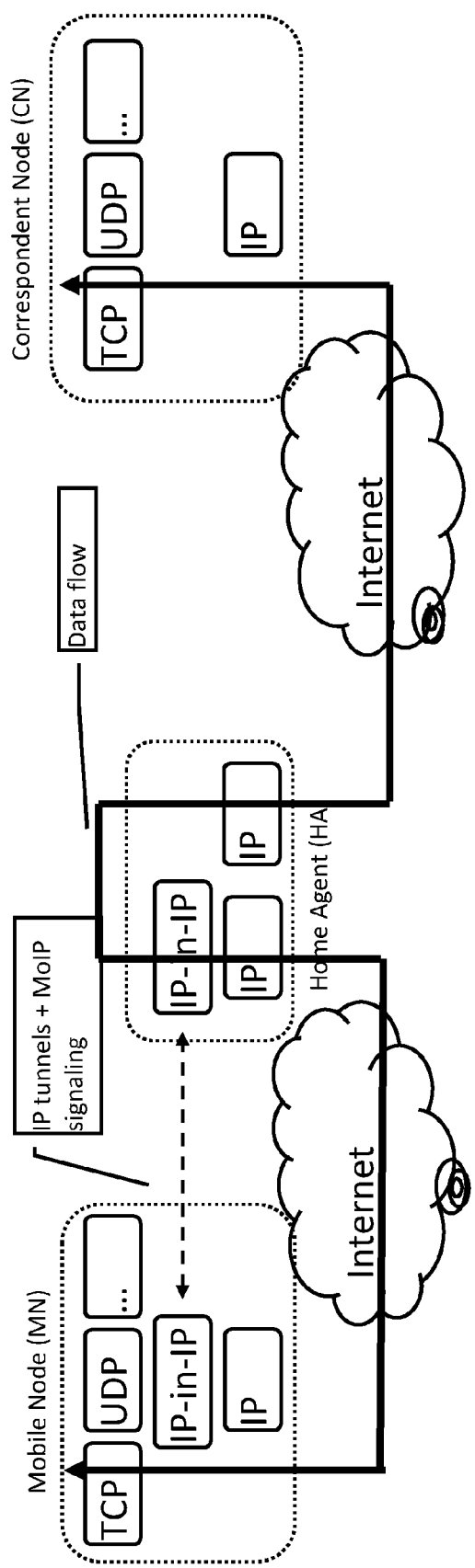
FIG. 1 illustrates methods and systems according to the state of the art, known as Mobile IP (MIP) systems and methods.

FIG. 1 presents the Mobile IP method of providing mobility by using an intermediate anchor in the form of a Home Agent (HA) to make the MN appear to be stationary to the CN—as a MN associates itself with alternate points of attachments to the Internet, a Mobile IP agent rebinds tunnels between the MN and the intermediate HA.

Figure 2:
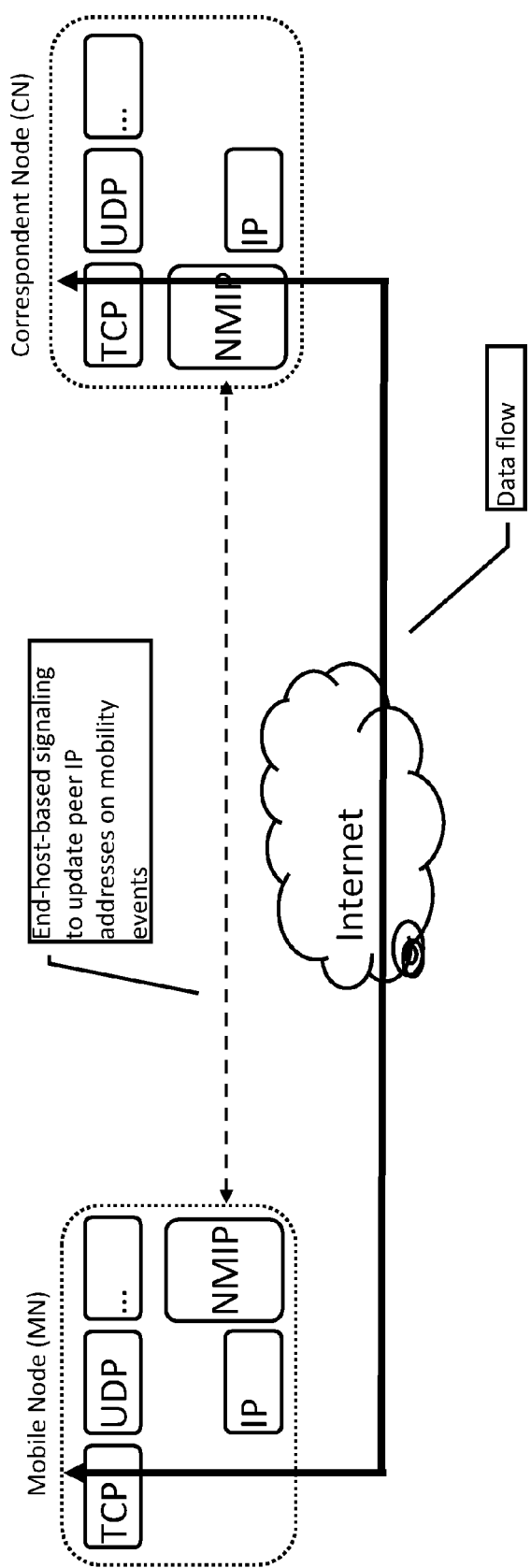
FIG. 2 illustrates methods and systems according to the state of the art, known as Not Mobile IP (NMIP) systems and methods.

FIG. 2 presents NMIP-based end-host-based mobility: here an agent in the IP stack signals between MNs and CNs of changes in attachment points in the network and packets flow directly between the MN and CN. If a MN finds another point of attachment to the Internet, this agent informs the CN of the new IP address.

A remaining problem of NMIP is how to support NMIP on a device that natively does not support NMIP.

Presently, to use NMIP, the MN's and CN's IP stacks need to modified to support NMIP-specific signaling, i.e., the protocol layer needs to be adapted to support changing the CN IP address in the Protocol Control Blocks (PCBs) and a signaling function needs to be embedded inside the IP stack for including the NMIP signaling in the outgoing IP packets. Without these modifications NMIP-based mobility requires more traditional methods for supporting mobility events (e.g. as is shown in FIG. 1).

Methods and devices are presented by which NMIP can be realized in a backward compatible manner. A method is presented which requires only minimal support from the existing MNs and no support for NMIP by the IP stacks on the CNs while still supporting NMIP.

Figure 3:
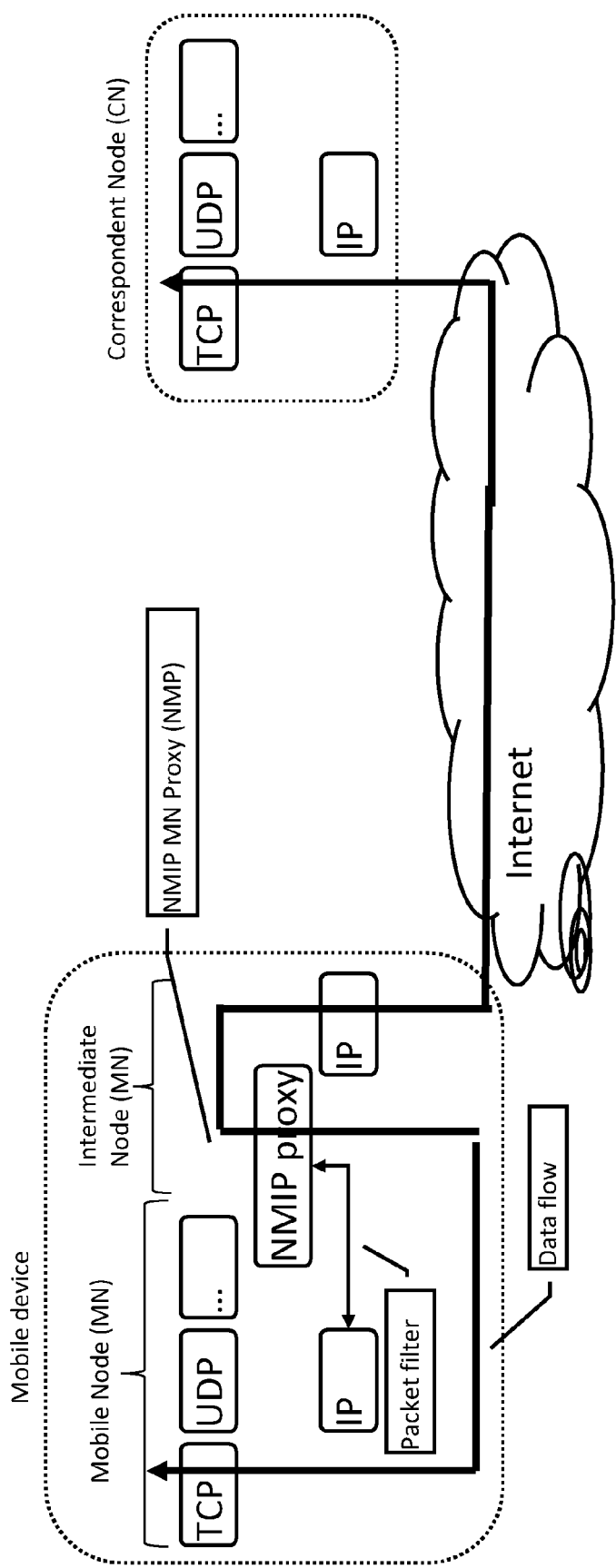
FIGS. 3 to 5 illustrate systems and methods according embodiments of the present invention.

A solution according to the present invention comprises extending unmodified hosts (MNs and/or CNs) with a NMIP proxy that performs Network Address (or Port) Translation for traffic between the inside, i.e., the unmodified host, and the outside, i.e. the Internet (NA(P)T=Network Address (and Port) Translator). FIG. 3 presents a method by which such NMIP proxies are embedded inside the communication chain between MNs and CNs. Note that hybrids between unmodified MNs and modified CNs (or vice versa) are equally supported.

In a first embodiment, illustrated in FIG. 3, a MN is extended with a user-level application NMIP proxy application, the NMIP MN Proxy (NMP) that (a) provides DHCP or other layer-2 address maintenance services to the inside MN IP stack, (b) performs NA(P)T for outgoing and incoming IP traffic towards and from a NMIP-capable CN and (c) executes the NMIP signaling protocol with CNs on behalf of the MN. The NMP receives all IP packets from the MN's inside IP stack and multiplexes the traffic over one or more interfaces, each of which using one or more IP addresses; this multiplexing is governed by the regular NMIP signaling protocol. As such, the NMP acts as a CN end-point to the MN, while it makes the MN look like an NMIP capable MN towards the CN. The inside address used by the original MN IP stack is provided for by the NMP and all inside traffic use this NMP provided IP address as a source IP address. When an IP packet is received by the NMP from the MN's inside IP stack, the NMP translates the IP packet using one of the IP addresses of one of its interfaces for communicating with the CN as dictated by the NMIP protocol. When a packet is received from a NMIP capable CN by the NMP, the proxy translates the destination IP address to the NMP provided IP address to make the packet appear to be transmitted towards the NMP provided IP address. This is to make certain that the unmodified MN's IP stack accepts the packet sent through the NMP. When the MN supports multiple parallel IP stacks, additionally port translation is required too.

Figure 4:
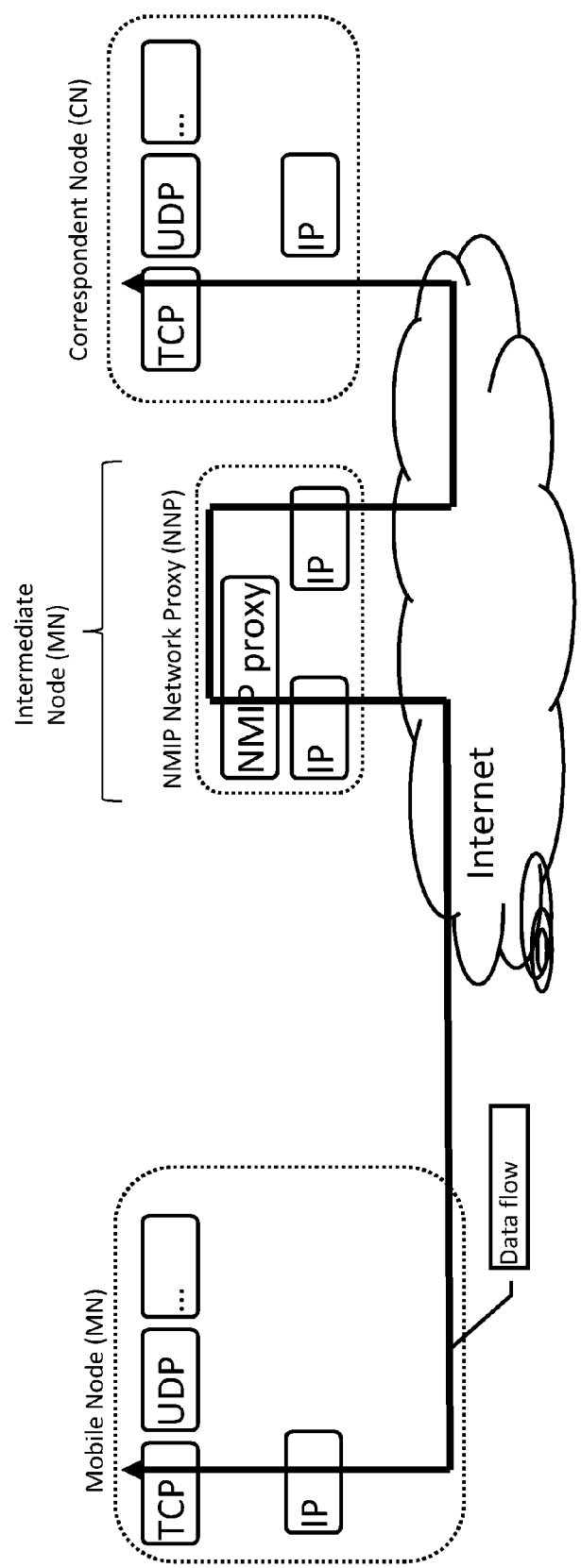

Similarly, in a further embodiment, illustrated in FIG. 4, since the NMIP protocol scheme is mostly symmetrical, to accommodate for unmodified CNs, a CN can use a reverse NMIP proxy, the NMIP Network Proxy (NNP), to map incoming NMIP traffic towards an unmodified CN. In this case, the NNP receives incoming packets from the Internet, and rewrites incoming IP packets with the IP address of the NNP's host machine to make these packets appear to originate from the NNP itself towards the CN. Since the NMIP-capable MN transmits packets directly to the NNP, it translates the destination IP address to the intended CN.

The unmodified CN transmits return packets directly to the NNP, rather than the MN. For packets originating from the CN, the NNP translates the source IP address to be its own IP address and the destination address is again, governed under the NMIP signaling protocol. Towards the CN, the NNP looks exactly like an unmodified MN, while in reality these packets originate either from another NMP for unmodified MN's or NMIP capable MNs for modified MNs. A CN may host its own NNP as a service for NMIP capable MNs, or, an end user may deploy its own NNP in a network-based computer as a general NMIP proxy service for unmodified NMIP CNs. Given that a CN NNP can service many different remote MNs, this NMIP function requires port translation.

While it makes sense to place the NNP function close to the CN, it can also reside at any other stationary point in the network. While this may cause suboptimal routing, the principal function of the NNP can still be prevailed and it still supports MN mobility. In such an embodiment, the NNP function can replace a home agent or anchor which is commonly used in conventional mobility protocols such as Mobile IP. Using an NNP instead of a home agent or anchor has the advantage that it does not require tunneling of traffic to the MN, which is more bandwidth efficient.

Figure 5:
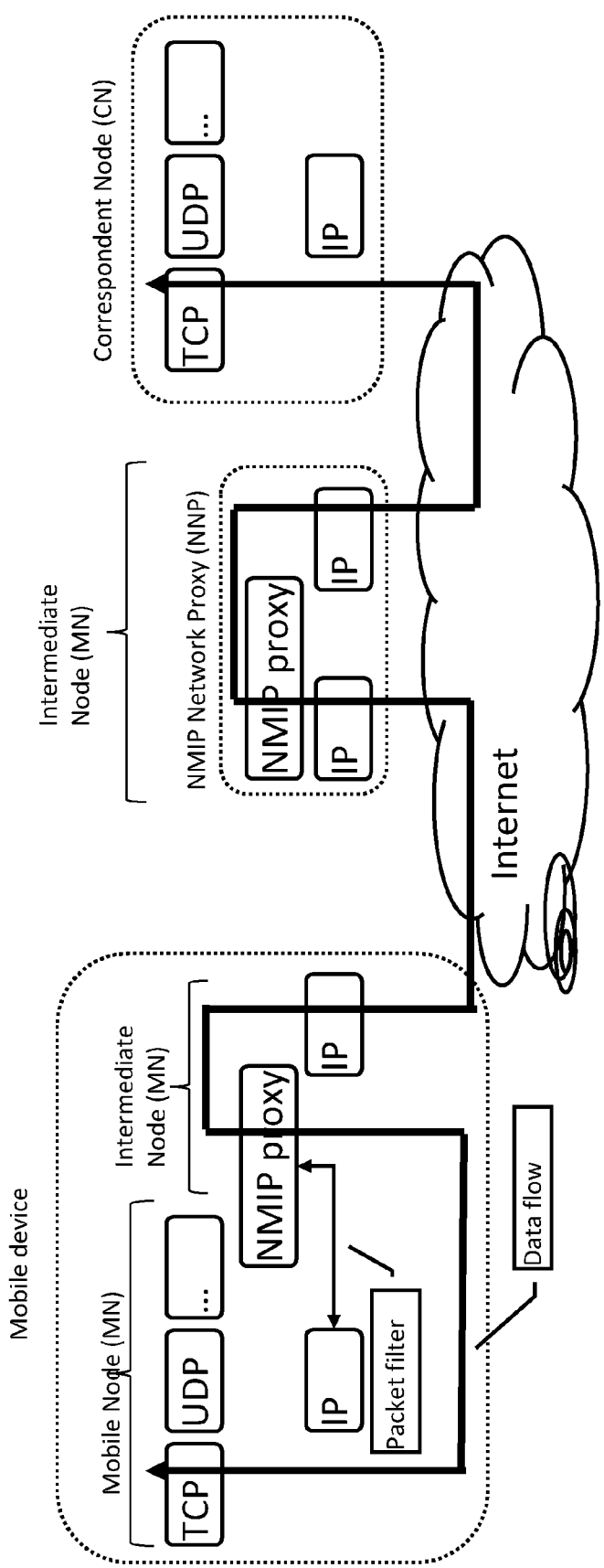

The invention can also be applied to embodiments where neither MN nor CN support NMIP but at least one of both end points is mobile. In such embodiments, NMP and NNP functions can be advantageously combined. This is the case, for instance, if both end points are mobile but at least one of them does not support native NMIP. In this case, each end point becomes a MN and sees its peer as a CN. This is illustrated in FIG. 5.

As will be recognized by the skilled person, the method and devices according to the present invention present a method by which unmodified corresponding nodes and slightly modified mobile nodes can use NMIP functionality without having to change their IP stacks. This allows a full deployment of NMIP and the start of an ecosystem for NMIP-capable hosts.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures. are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The invention claimed is:

1. A method for routing packets in an intermediate node between correspondent nodes in a packet-switched network, said packet-switched network having a protocol stack comprising an upper layer and a lower layer and comprising an upper-layer session between a correspondent node and a mobile node in which packets are transmitted between the correspondent node and the mobile node via the packet-switched network; and wherein only one of said correspondent node and said mobile node, called a macro-mobility enabled node, is configured to maintain the upper-layer session with the other node, when said mobile node is switching from a first lower-layer-address to a second lower-layer-address, different from the first lower-layer-address, by exchanging suitable lower-layer address update related messages with said other node, comprising at said intermediate node:

exchanging lower-layer-address-update-related messages with said macro-mobility enabled node;

mapping source address, destination address and potentially protocol parameters of lower-layer packets exchanged between said mobile node and said correspondent node in such a way that the macro-mobility enabled node can communicate with said other node as if said other node is also macro-mobility enabled, and such that said other node can communicate with said intermediate node as if said intermediate node is a non-macro-mobility-enabled node;

wherein said intermediate node is embodied as a user-level application installed on a non-macro-mobility enabled user device, said non-macro-mobility enabled user device corresponding to said mobile node;

wherein exchanging lower-layer-address-update related messages comprises receiving lower-layer-address update related messages from said correspondent node and sending lower-layer-address update related messages to said correspondent node and wherein mapping source address, destination address and potentially protocol parameters of lower-layer packets exchanged between said mobile node and said correspondent node comprises:

for packets sent from said mobile node to said correspondent node: replacing the lower layer source address, assigned by said intermediate node to said mobile node, by the lower layer address of said intermediate node, and potentially replacing protocol parameters;

for packets sent from said correspondent node to said mobile node:

replacing the destination address corresponding to the lower-layer address of said intermediate node by the lower-layer address of said mobile node assigned by said intermediate node, and potentially replacing protocol parameters.

2. Method according to claim 1, further comprising performing DHCP, or other layer-2 IP address requesting functions.

3. A method according to claim 1, wherein said lower-layer address update related messages are messages used in methods according to the NMIP protocol.

4. The method according to claim 1, wherein the upper layer is a transport layer or an application layer; and the lower layer is a network layer.

5. The method according to claim 4, wherein said network layer is an IP layer.

6. The method according to claim 1, wherein said mobile node is not assigned a permanent lower-layer address corresponding to a home-network lower-layer address.

7. A method according to claim 1, wherein said intermediate node adopts one or more of the original lower-layer addresses of the mobile node and assigns a new lower-layer address to the mobile node during installation.

8. A method according to claim 1, wherein said lower-layer address update related messages are messages used in methods according to the NMIP protocol;

wherein the NMIP protocol is an end-host-based signaling protocol that enables Mobile Nodes and Correspondent Nodes to update each other with IP address changes at mobility events and to reroute traffic for established upper-layer sessions using newly obtained IP addresses without breaking connections.

9. A method according to claim 1, wherein the intermediate node does not perform tunneling between the macro-mobility enabled node and the other node.

10. A method for routing packets in an intermediate node between correspondent nodes in a packet-switched network, said packet-switched network having a protocol stack comprising an upper layer and a lower layer and comprising an upper-layer session between a correspondent node and a mobile node in which packets are transmitted between the correspondent node and the mobile node via the packet-switched network; and wherein only one of said correspondent node and said mobile node, called a macro-mobility enabled node, is configured to maintain the upper-layer session with the other node, when said mobile node is switching from a first lower-layer-address to a second lower-layer-address, different from the first lower-layer-address, by exchanging suitable lower-layer address update related messages with said other node, comprising at said intermediate node:

exchanging lower-layer-address-update-related messages with said macro-mobility enabled node;

mapping source address, destination address and potentially protocol parameters of lower-layer packets exchanged between said mobile node and said correspondent node in such a way that the macro-mobility enabled node can communicate with said other node as if said other node is also macro-mobility enabled, and such that said other node can communicate with said intermediate node as if said intermediate node is a non-macro-mobility-enabled node;

wherein said intermediate node is embodied by a network server, which communicates with said non-macro-mobility enabled correspondent node;

wherein exchanging said lower-layer-address-update related messages comprises receiving lower-layer-address update-related messages from said mobile node and sending lower-layer-address update related messages to said mobile node, and wherein mapping source address, destination address and potentially protocol parameters of lower-layer packets exchanged between said mobile node and said correspondent node comprises:

for packets sent from said correspondent node to said mobile node: replacing the lower layer source address, assigned by said intermediate node to said mobile node, by the lower layer address of said intermediate node, and potentially replacing protocol parameters;

for packets sent from said mobile node to said correspondent node: replacing the destination address corresponding to the lower-layer address of said intermediate node by the lower-layer address of said mobile node assigned by said intermediate node, and potentially replacing protocol parameters.

11. A mobile device for use in data communication in a packet-switched network, said network having a protocol stack comprising an upper layer and a lower layer, and said mobile device being configured to participate in an upper-layer session between a mobile node comprised in said mobile device and a correspondent node in said network, wherein only the correspondent node, called a macro-mobility enabled node, is configured to maintain the upper-layer session with the mobile node when said mobile node is switching from a first lower-layer-address to a second lower-layer-address, different from the first lower-layer-address, by exchanging suitable lower-layer address update related messages with the mobile node said mobile device comprising a storage means for storing and a processor for running a user level application embodying an intermediate node of said network, said intermediate node being configured to:

exchange lower-layer-address-update-related messages with said correspondent node;

map source and destination address and potentially protocol parameters of lower-layer packets exchanged between said mobile node and said correspondent node in such a way that the correspondent node can communicate with said mobile node as if said mobile node is also macro-mobility enabled, and such that said mobile node can communicate with said intermediate node as if said intermediate node is a non-macro-mobility-enabled node;

wherein exchanging lower-layer-address-update related messages comprises receiving lower-layer-address update related messages from said correspondent node and sending lower-layer-address update related messages to said correspondent node, and wherein mapping source address, destination address and potentially protocol parameters of lower-layer packets exchanged between said mobile node and said correspondent node comprises:

for packets sent from said mobile node to said correspondent node: replacing the lower layer source address, assigned by said intermediate node to said mobile node, by the lower layer address of said intermediate node, and potentially replacing protocol parameters;

for packets sent from said correspondent node to said mobile node: replacing the destination address corresponding to the lower-layer address of said intermediate node by the lower-layer address of said mobile node assigned by said intermediate node, and potentially replacing protocol parameters.

12. A server for use as an intermediate node in a packet-switched network, said network having a protocol stack comprising an upper layer and a lower layer, and said server being configured to participate in an upper-layer session between a mobile node and a correspondent node, wherein only the mobile node, called a macro-mobility enabled node, is configured to maintain the upper-layer session with the correspondent node, when said mobile node is switching from a first lower-layer-address to a second lower-layer-address, different from the first lower-layer address, by exchanging suitable lower-layer address update related messages with said correspondent node, said server including:

a memory with executable instructions stored thereon; and a processor configured to access said memory to execute said instructions and to:

exchange lower-layer-address-update-related messages with said mobile node;

map source address, destination address and potentially protocol parameters of lower-layer packets exchanged between said mobile node and said correspondent node in such a way that the mobile node can communicate with said correspondent node as if said correspondent node is also macro-mobility enabled, and such that said correspondent node can communicate with said intermediate node as if said intermediate node is a non-macro-mobility-enabled node;

wherein exchanging said lower-layer-address-update related messages comprises receiving lower-layer-address update-related messages from said mobile node and sending lower-layer-address update related messages to said mobile node, and wherein mapping source address, destination address and potentially protocol parameters of lower-layer packets exchanged between said mobile node, and said processor is further configured to:

for packets sent from said correspondent node to said mobile node: replace the lower layer source address, assigned by said intermediate node to said mobile node by the lower layer address of said intermediate node, and potentially replacing protocol parameters;

for packets sent from said mobile node to said correspondent node: replace the destination address corresponding to the lower-layer address of said intermediate node by the lower-layer address of said mobile node assigned by said intermediate node, and potentially replacing protocol parameters.

* * * * *